(12) United States Patent
Vallala et al.

(10) Patent No.: US 10,782,887 B2
(45) Date of Patent: Sep. 22, 2020

(54) WINDOW-BASED PRORITY TAGGING OF IOPS IN A DISTRIBUTED STORAGE SYSTEM

(71) Applicant: Robin Systems, Inc., San Jose, CA (US)

(72) Inventors: Shravan Kumar Vallala, San Jose, CA (US); Dhanashankar Venkatesan, San Jose, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 0 days.

(21) Appl. No.: 15/806,769

(22) Filed: Nov. 8, 2017

(65) Prior Publication Data

US 2019/0138222 A1    May 9, 2019

(51) Int. Cl.
*G06F 3/00* (2006.01)
*G06F 3/06* (2006.01)
*G06F 12/02* (2006.01)

(52) U.S. Cl.
CPC ............ *G06F 3/0613* (2013.01); *G06F 3/067* (2013.01); *G06F 3/0659* (2013.01); *G06F 3/0689* (2013.01); *G06F 12/0246* (2013.01)

(58) Field of Classification Search
CPC .......................... G06F 12/0246; G06F 3/0659
See application file for complete search history.

(56) References Cited

U.S. PATENT DOCUMENTS

| | | | |
|---|---|---|---|
| 4,310,883 A | 1/1982 | Clifton | |
| 5,602,993 A | 2/1997 | Stromberg | |
| 6,014,669 A | 1/2000 | Slaughter | |
| 6,052,797 A | 4/2000 | Ofek | |
| 6,119,214 A | 9/2000 | Dirks | |
| 6,157,963 A * | 12/2000 | Courtright, II | G06F 3/061 710/40 |
| 6,161,191 A | 12/2000 | Slaughter | |
| 6,298,478 B1 | 10/2001 | Nally | |
| 6,301,707 B1 | 10/2001 | Carroll | |
| 6,311,193 B1 | 10/2001 | Sekido | |

(Continued)

FOREIGN PATENT DOCUMENTS

WO    WO2017008675    1/2017

OTHER PUBLICATIONS

Segment map, Google, Feb. 4, 2019.

(Continued)

*Primary Examiner* — Reginald G Bragdon
*Assistant Examiner* — Michael L Westbrook
(74) *Attorney, Agent, or Firm* — David R. Stevens; Stevens Law Group

(57) ABSTRACT

A distributed storage schemes manages implementation of QoS targets for IOPs across compute nodes executing applications, primary storage nodes storing a primary copy of a logical storage volume, and clone storage nodes. On the compute node, a maximum priority is assigned to a minimum number of IOPs in a queue within a time window from a time of receipt of a last unexecuted IOP. Other IOPs are assigned a minimum priority. On the storage node, maximum priority IOPs are assigned to high priority queues, from which IOPs are executed first, and low priority IOPs are assigned to low priority queues. Methods for determining the capacity of storage nodes and allocating storage requests are also disclosed.

16 Claims, 9 Drawing Sheets

(56) References Cited

U.S. PATENT DOCUMENTS

| | | |
|---|---|---|
| 6,851,034 B2 | 2/2005 | Challenger |
| 6,886,160 B1 | 4/2005 | Lee |
| 6,895,485 B1 | 5/2005 | Dekoning |
| 6,957,221 B1 | 10/2005 | Hart |
| 7,096,465 B1 | 8/2006 | Dardinski |
| 7,111,055 B2 | 9/2006 | Falkner |
| 7,171,659 B2 | 1/2007 | Becker |
| 7,246,351 B2 | 7/2007 | Bloch |
| 7,305,671 B2 | 12/2007 | Davidov |
| 7,461,374 B1 | 12/2008 | Balint |
| 7,590,620 B1 | 9/2009 | Pike |
| 7,698,698 B2 | 4/2010 | Skan |
| 7,721,283 B2 | 5/2010 | Kovachka |
| 7,734,859 B2 | 6/2010 | Daniel |
| 7,738,457 B2 | 6/2010 | Nordmark |
| 7,779,091 B2 | 8/2010 | Wilkinson |
| 7,797,693 B1 | 9/2010 | Gustafson |
| 7,984,485 B1 | 7/2011 | Rao |
| 8,037,471 B2 | 10/2011 | Keller |
| 8,121,874 B1 | 2/2012 | Guheen |
| 8,171,141 B1 | 5/2012 | Offer |
| 8,219,821 B2 | 7/2012 | Zimmels |
| 8,261,295 B1 | 9/2012 | Risbood |
| 8,326,883 B2 | 12/2012 | Pizzorni |
| 8,392,498 B2 | 3/2013 | Berg |
| 8,429,346 B1 | 4/2013 | Chen |
| 8,464,241 B2 | 6/2013 | Hayton |
| 8,505,003 B2 | 8/2013 | Bowen |
| 8,527,544 B1 | 9/2013 | Colgrove |
| 8,601,467 B2 | 12/2013 | Hofhansl |
| 8,620,973 B1 | 12/2013 | Veeraswamy |
| 8,666,933 B2 | 3/2014 | Pizzorni |
| 8,745,003 B1 | 6/2014 | Patterson |
| 8,775,751 B1 | 7/2014 | Pendharkar |
| 8,782,632 B1 | 7/2014 | Chigurapati |
| 8,788,634 B2 | 7/2014 | Krig |
| 8,832,324 B1* | 9/2014 | Hodges .............. G06F 13/1642 710/5 |
| 8,886,806 B2 | 11/2014 | Tung |
| 8,909,885 B2 | 12/2014 | Corbett |
| 8,966,198 B1 | 2/2015 | Harris |
| 9,134,992 B2 | 9/2015 | Wong |
| 9,146,769 B1 | 9/2015 | Shankar |
| 9,148,465 B2 | 9/2015 | Gambardella |
| 9,152,337 B2 | 10/2015 | Kono |
| 9,167,028 B1 | 10/2015 | Bansal |
| 9,280,591 B1 | 3/2016 | Kharatishvili |
| 9,330,155 B1 | 5/2016 | Bono |
| 9,336,060 B2 | 5/2016 | Nori |
| 9,342,444 B2 | 5/2016 | Minckler |
| 9,367,301 B1 | 6/2016 | Serrano |
| 9,436,693 B1 | 9/2016 | Lockhart |
| 9,521,198 B1 | 12/2016 | Agarwala |
| 9,569,274 B2 | 2/2017 | Tarta |
| 9,600,193 B2 | 3/2017 | Ahrens |
| 9,619,389 B1 | 4/2017 | Roug |
| 9,635,132 B1 | 4/2017 | Lin |
| 9,667,470 B2 | 5/2017 | Prathipati |
| 9,747,096 B2 | 8/2017 | Searle |
| 9,870,366 B1 | 1/2018 | Duan |
| 9,892,265 B1 | 2/2018 | Tripathy |
| 9,998,955 B1 | 6/2018 | MacCarthaigh |
| 10,019,459 B1 | 7/2018 | Agarwala |
| 10,042,628 B2 | 8/2018 | Thompson |
| 10,061,520 B1 | 8/2018 | Zhao |
| 10,191,778 B1 | 1/2019 | Yang |
| 10,241,774 B2 | 3/2019 | Spivak |
| 10,282,229 B2 | 5/2019 | Wagner |
| 10,353,634 B1 | 7/2019 | Greenwood |
| 10,430,434 B2 | 10/2019 | Sun |
| 2004/0153703 A1 | 8/2004 | Vigue |
| 2004/0221125 A1 | 11/2004 | Ananthanarayanan |
| 2005/0065986 A1 | 3/2005 | Bixby |
| 2005/0216895 A1 | 9/2005 | Tran |
| 2006/0085674 A1 | 4/2006 | Ananthamurthy |
| 2007/0006015 A1 | 1/2007 | Rao |
| 2007/0067583 A1 | 3/2007 | Zohar |
| 2007/0260842 A1 | 11/2007 | Faibish |
| 2007/0277056 A1 | 11/2007 | Varadarajan |
| 2007/0288791 A1 | 12/2007 | Allen |
| 2008/0068899 A1 | 3/2008 | Ogihara |
| 2008/0189468 A1 | 8/2008 | Schmidt |
| 2008/0270592 A1 | 10/2008 | Choudhary |
| 2009/0144497 A1 | 6/2009 | Withers |
| 2009/0172335 A1 | 7/2009 | Kulkarni |
| 2009/0307249 A1 | 12/2009 | Koifman |
| 2010/0161941 A1* | 6/2010 | Vyshetsky .......... G06F 13/1605 712/205 |
| 2010/0162233 A1 | 6/2010 | Ku |
| 2010/0211815 A1 | 8/2010 | Mankovskii |
| 2010/0274984 A1 | 10/2010 | Inomata |
| 2010/0299309 A1 | 11/2010 | Maki |
| 2010/0306495 A1 | 12/2010 | Kumano |
| 2010/0332730 A1 | 12/2010 | Royer |
| 2011/0083126 A1 | 4/2011 | Bhakta |
| 2011/0188506 A1 | 8/2011 | Arribas |
| 2011/0208928 A1 | 8/2011 | Chandra |
| 2011/0246420 A1 | 10/2011 | Wang |
| 2011/0276951 A1 | 11/2011 | Narayanamurthy |
| 2012/0005557 A1 | 1/2012 | Mardiks |
| 2012/0066449 A1 | 3/2012 | Colgrove |
| 2012/0102369 A1 | 4/2012 | Hiltunen |
| 2012/0216052 A1 | 8/2012 | Dunn |
| 2012/0226667 A1 | 9/2012 | Volvovski |
| 2012/0240012 A1 | 9/2012 | Weathers |
| 2012/0265976 A1 | 10/2012 | Spiers |
| 2012/0311671 A1 | 12/2012 | Wood |
| 2012/0331113 A1 | 12/2012 | Jain |
| 2013/0054552 A1 | 2/2013 | Hawkins |
| 2013/0054932 A1 | 2/2013 | Acharya |
| 2013/0080723 A1 | 3/2013 | Sawa |
| 2013/0282662 A1 | 10/2013 | Kumarasamy |
| 2013/0339659 A1 | 12/2013 | Bybell |
| 2013/0346709 A1 | 12/2013 | Wang |
| 2014/0006465 A1 | 1/2014 | Davis |
| 2014/0047263 A1 | 2/2014 | Coatney |
| 2014/0047341 A1 | 2/2014 | Breternitz |
| 2014/0047342 A1 | 2/2014 | Breternitz |
| 2014/0058871 A1 | 2/2014 | Marr |
| 2014/0059527 A1 | 2/2014 | Gagliardi |
| 2014/0059528 A1 | 2/2014 | Gagliardi |
| 2014/0108483 A1 | 4/2014 | Tarta |
| 2014/0130040 A1 | 5/2014 | Lemanski |
| 2014/0195847 A1 | 7/2014 | Webman |
| 2014/0245319 A1 | 8/2014 | Fellows |
| 2014/0282596 A1 | 9/2014 | Bourbonnais |
| 2015/0046644 A1 | 2/2015 | Karp |
| 2015/0067031 A1 | 3/2015 | Acharya |
| 2015/0074358 A1 | 3/2015 | Flinsbaugh |
| 2015/0112951 A1 | 4/2015 | Narayanamurthy |
| 2015/0134857 A1* | 5/2015 | Hahn ................... G06F 3/061 710/5 |
| 2015/0149605 A1 | 5/2015 | de la Iglesia |
| 2015/0186217 A1 | 7/2015 | Eslami |
| 2015/0278333 A1 | 10/2015 | Hirose |
| 2015/0326481 A1 | 11/2015 | Rector |
| 2015/0379287 A1 | 12/2015 | Mathur |
| 2016/0011816 A1 | 1/2016 | Aizman |
| 2016/0042005 A1 | 2/2016 | Liu |
| 2016/0124775 A1 | 5/2016 | Ashtiani |
| 2016/0197995 A1 | 7/2016 | Lu |
| 2016/0259597 A1 | 9/2016 | Worley |
| 2016/0283261 A1 | 9/2016 | Nakatsu |
| 2016/0357456 A1* | 12/2016 | Iwasaki ................ G06F 3/0613 |
| 2016/0357548 A1 | 12/2016 | Stanton |
| 2017/0060710 A1 | 3/2017 | Ramani |
| 2017/0060975 A1 | 3/2017 | Akyureklier |
| 2017/0149843 A1 | 5/2017 | Amulothu |
| 2017/0168903 A1 | 6/2017 | Dornemann |
| 2017/0192889 A1 | 7/2017 | Sato |
| 2017/0214550 A1 | 7/2017 | Kumar |
| 2017/0235649 A1 | 8/2017 | Shah |
| 2017/0242719 A1 | 8/2017 | Tsirkin |
| 2017/0244557 A1 | 8/2017 | Riel |

(56) References Cited

U.S. PATENT DOCUMENTS

| | | |
|---|---|---|
| 2017/0244787 A1 | 8/2017 | Rangasamy |
| 2017/0322954 A1 | 11/2017 | Horowitz |
| 2017/0337492 A1 | 11/2017 | Chen |
| 2017/0371551 A1 | 12/2017 | Sachdev |
| 2018/0006896 A1 | 1/2018 | MacNamara |
| 2018/0024889 A1 | 1/2018 | Verma |
| 2018/0046553 A1 | 2/2018 | Okamoto |
| 2018/0082053 A1 | 3/2018 | Brown |
| 2018/0107419 A1 | 4/2018 | Sachdev |
| 2018/0113625 A1 | 4/2018 | Sancheti |
| 2018/0113770 A1 | 4/2018 | Hasanov |
| 2018/0136931 A1 | 5/2018 | Hendrich |
| 2018/0137306 A1 | 5/2018 | Brady |
| 2018/0159745 A1 | 6/2018 | Byers |
| 2018/0165170 A1 | 6/2018 | Hegdal |
| 2018/0218000 A1 | 8/2018 | Setty |
| 2018/0246745 A1 | 8/2018 | Aronovich |
| 2018/0247064 A1 | 8/2018 | Aronovich |
| 2018/0276215 A1 | 9/2018 | Chiba |
| 2018/0285164 A1 | 10/2018 | Hu |
| 2018/0285223 A1 | 10/2018 | McBride |
| 2018/0285353 A1 | 10/2018 | Ramohalli |
| 2018/0287883 A1 | 10/2018 | Joshi |
| 2018/0302335 A1 | 10/2018 | Gao |
| 2018/0329981 A1 | 11/2018 | Gupte |
| 2018/0364917 A1 | 12/2018 | Ki |
| 2018/0375728 A1 | 12/2018 | Gangil |
| 2019/0065061 A1 | 2/2019 | Kim |
| 2019/0065323 A1 | 2/2019 | Dhamdhere |
| 2019/0073132 A1 | 3/2019 | Zhou |
| 2019/0073372 A1 | 3/2019 | Venkatesan |
| 2019/0079928 A1 | 3/2019 | Kumar |
| 2019/0089651 A1 | 3/2019 | Pignataro |
| 2019/0109756 A1 | 4/2019 | Abu Lebdeh |
| 2019/0156023 A1 | 5/2019 | Gerebe |
| 2019/0163460 A1 | 5/2019 | Kludy |
| 2019/0188094 A1 | 6/2019 | Ramamoorthi |
| 2019/0190803 A1 | 6/2019 | Joshi |
| 2019/0199601 A1 | 6/2019 | Lynar |
| 2019/0213085 A1 | 7/2019 | Alluboyina |
| 2019/0215313 A1 | 7/2019 | Doshi |
| 2019/0220266 A1 | 7/2019 | Doshi |
| 2019/0220315 A1 | 7/2019 | Vallala |
| 2019/0235895 A1 | 8/2019 | Ovesea |
| 2019/0250849 A1 | 8/2019 | Compton |
| 2019/0278624 A1 | 9/2019 | Bade |
| 2019/0324666 A1 | 10/2019 | Kusters |
| 2020/0019414 A1 | 1/2020 | Byard |
| 2020/0034193 A1 | 1/2020 | Jayaram |
| 2020/0083909 A1 | 3/2020 | Kusters |

OTHER PUBLICATIONS

Fast and Secure Append-Only storage with Infinite Capacity, Zheng, Aug. 27, 2003.

User Mode and Kernel Mode, Microsoft, Apr. 19, 2017.

Precise memory leak detection for java software using container profiling, Xu, Jul. 2013.

Mogi et al., "Dynamic Parity Stripe Reorganizations for RAID5 Disk Arrays," 1994, IEEE, pp. 17-26.

Syed et al, "The Container Manager Pattern", ACM, pp. 1-9 (Year 2017).

Rehmann et al., "Performance of Containerized Database Management Systems", ACM, pp. 1-6 (Year 2018).

Awada et al, " Improving Resource Efficiency of Container-instance Clusters on Clouds", IEEE, pp. 929-934 (Year 2017).

Stankovski et al, "Implementing Time- Critical Functionalities with a Distributed Adaptive Container Architecture", ACM, pp. 1-5 (Year 2016).

Dhakate et al, "Distributed Cloud Monitoring Using Docker as Next Generation Container Virtualization Technology" IEEE, pp. 1-5 (Year 2015).

Crameri et al, "Staged Deployment in Mirage, an Integrated Software Upgrade Testing and Distribution System", ACM, pp. 221-236 (Year: 2007).

Cosmo et al, "Packages Upgrades in FOSS Distributions: Details and Challenges", ACM 2008).

Burg et al, "Atomic Upgrading of Distributed Systems", ACM, pp. 1-5 (Year: 2008).

Souer et al, "Component Based Architecture forWeb Content Management: Runtime Deployable Web Manager Component Bundles", IEEE, pp. 366-369 (Year: 2008).

Weingartner et al, "A distributed autonomic management framework for cloud computing orchestration." In 2016 IEEE World Congress on Services (Year: 2016).

Weingartner, Rafael, Gabriel Beims Brascher, and Carlos Becker Westphal!. "A distributed autonomic management framework for cloud computing orchestration." In 2016 IEEE World Congress on Services (Year: 2016).

* cited by examiner

US 10,782,887 B2

WINDOW-BASED PRORITY TAGGING OF IOPS IN A DISTRIBUTED STORAGE SYSTEM

RELATED APPLICATIONS

This application is related to U.S. application Ser. No. 15/807,035 filed Nov. 8, 2017 and U.S. application Ser. No. 15/806,795 filed Nov. 8, 2017, which are incorporated herein by reference for all purposes.

FIELD OF THE INVENTION

This invention relates to storing and retrieving information in a distributed storage system.

BACKGROUND OF THE INVENTION

A provider of data storage may market services with a guaranteed quality of service (QoS). For example, for a higher quality of a service, the provider may charge a higher price. However, in order to implement this approach, input/output operations (IOPs) must be processed in such a way that the guaranteed QoS is met. This requires additional processing, which can increase latency.

The system and methods disclosed herein implementing a QoS-based prioritization of IOPs in a distributed storage system.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
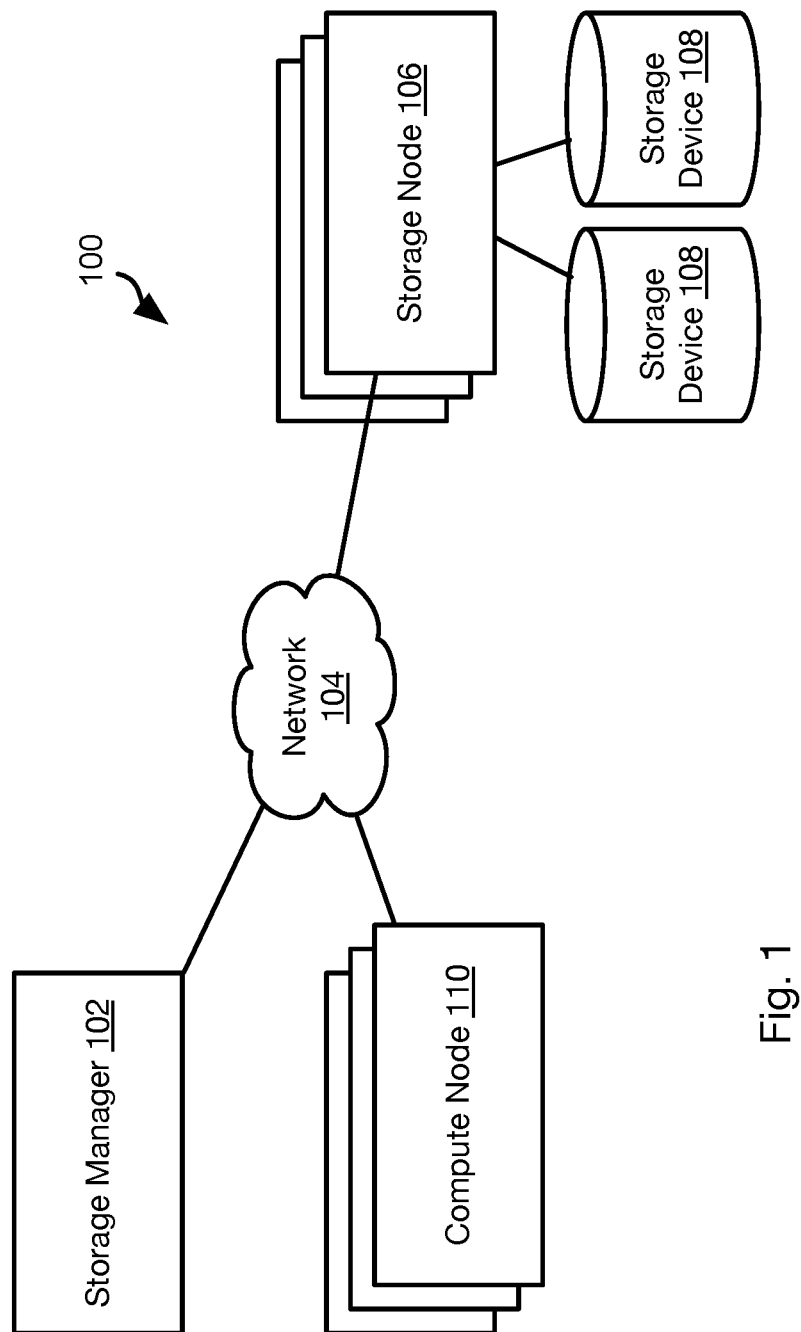
FIG. 1 is a schematic block diagram of a network environment for implementing methods in accordance with an embodiment of the present invention.

Referring to FIG. 1, the methods disclosed herein may be performed using the illustrated network environment 100. The network environment 100 includes a storage manager 102 that coordinates the storage of data corresponding to one or more logical storage volumes. In particular, the storage manager 102 may be connected by way of a network 104 to the one or more storage nodes 106, each storage node having one or more storage devices 108, e.g. hard disk drives, flash memory, or other persistent or transitory memory. The network 104 may be a local area network (LAN), wide area network (WAN), or any other type of network including wired, fireless, fiber optic, or any other type of network connections.

One or more compute nodes 110 are also coupled to the network 104 and host user applications that generate read and write requests with respect to storage volumes managed by the storage manager 102 and stored within the memory devices 108 of the storage nodes 108.

The methods disclosed herein ascribe certain functions to the storage manager 102, storage nodes 106, and compute node 110. The methods disclosed herein are particularly useful for large scale deployment including large amounts of data distributed over many storage nodes 106 and accessed by many compute nodes 110. However, the methods disclosed herein may also be implemented using a single computer implementing the functions ascribed herein to some or all of the storage manager 102, storage nodes 106, and compute node 110.

Figure 2A:
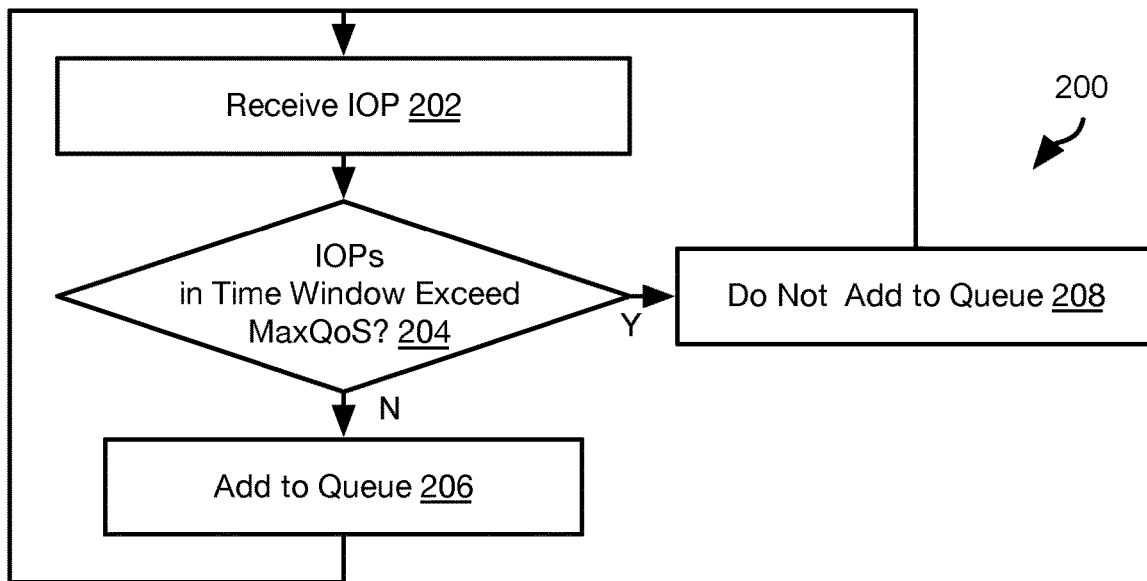
FIG. 2A is a process flow diagram of a method for adding IOPs to a queue based on a QoS in accordance with an embodiment of the present invention.
Figure 2B:
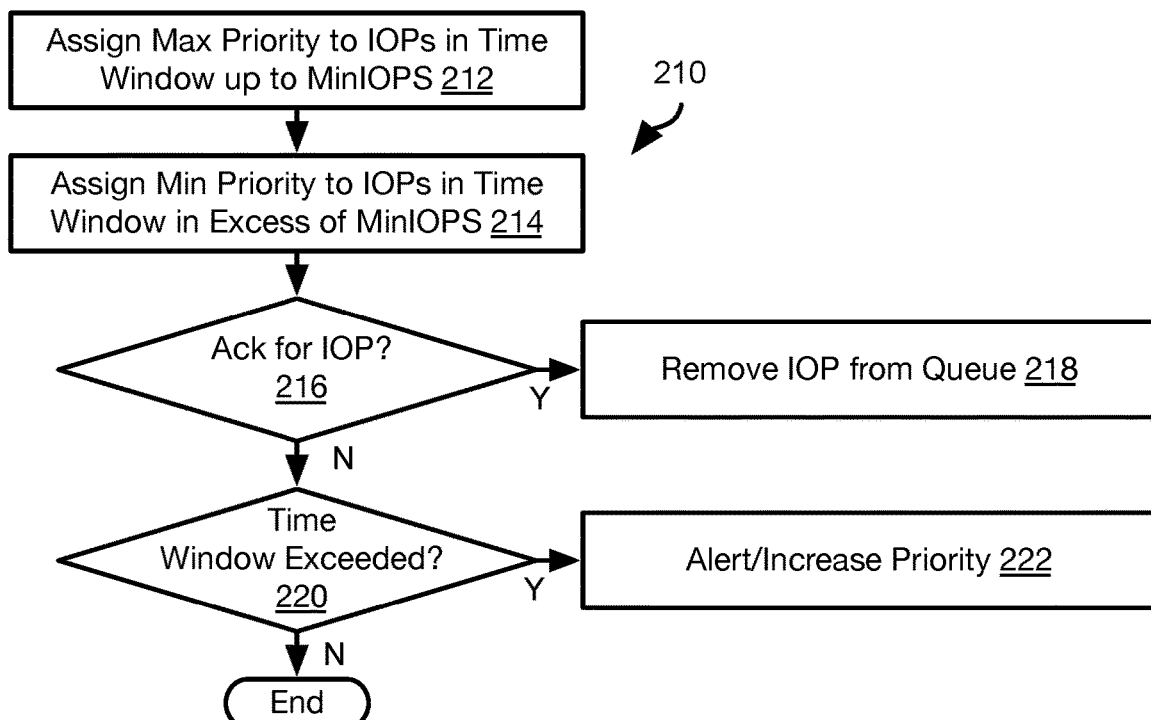
FIG. 2B is a process flow diagram of a method for assigning priorities to IOPs in a queue in accordance with an embodiment of the present invention.

Referring to FIGS. 2A and 2B, the illustrated methods provide an approach for managing a queue of IOPs (input/output operations) based on a QoS (quality of service) target for a logical storage volume referenced by the IOPs. Each IOP may be a read command or write command. In some embodiments, each IOP processed according to the methods described below may represent many individual IOPS, e.g., one or more thousands of IOPs. The illustrated method 200 is describe below as being executed by a compute node 110 executing applications that generate IOPs for execution by the storage nodes 106. However, the illustrated method 200 could be executed by any one of the components 102, 106, 110 shown in FIG. 1 or by a combination thereof.

As described below, the QoS for a queue group may be defined using one or more values such as:

A time window within which the performance for a particular queue group is evaluated.

A MinIOPs value that defines the minimum number of IOPs that must be performed for that queue group within the time window, e.g. 10,000 IOPs/second.

A MaxIOPs value that defines the maximum number of IOPs that are permitted to be performed for that queue group within the time window.

Note that "queue group" is used to refer to a grouping of one or more logical storage volumes, or portions of a logical storage volume, having a QoS associated therewith that are collectively managed with respect to the same QoS. A single customer may have multiple queue groups or multiple customers may belong to the same queue group. An association between a logical storage volume, the queue group to which the logical storage volume belongs, and the QoS for that queue group may be stored by the storage manager 102 and propagated to one or both of the compute nodes 110 and storage nodes 106 for use according to the methods disclosed herein. Likewise, the MinIOPs, MaxIOPs, and time window for a queue group may be maintained by the storage manager 102 and propagated to one or both of the compute nodes 110 and storage nodes 106.

Referring specifically to FIG. 2A, the method 200 may include receiving 202 an IOP ("the subject IOP") from an application of one or more applications executing on the compute node 110. The IOP may reference a logical storage volume ("the subject volume") that belongs to a queue group ("the subject queue group"). The subject IOP may include other information sufficient to execute the IOP according to any approach known in the art, such as an offset within the logical storage volume, operation code (read, write, delete, etc.), size, etc.

The method 200 may include evaluating 204 the number of IOPs in a queue of the compute node that both (a) belong to the subject queue group and (b) were added to the queue within the time window from an oldest unexecuted IOP in the queue belonging to the subject queue group. If the number of IOPs meeting conditions (a) and (b) is found 204 to be less than the MaxIOPs for the subject queue group, the subject IOP is added 206 to the queue. Note that each queue group may have its own queue and therefore this queue is evaluated at step 204.

If the number of IOPs meeting conditions (a) and (b) is found 204 to be less than the MaxIOPs value for the subject queue group, then the subject IOP is not added 208 to the queue. As soon as the condition of step 204 is met, the subject IOP will then be added to the queue.

In some embodiments, a set of threads may be dedicated to the queue for each queue group. When the number of IOPs for that queue group has exceeded the maximum threshold for a time period, these threads are put to sleep until the end of the time period, so that they do not service any more incoming IOPs. For example, consider a QoS period of 5 seconds and a max IOPs in that period of 100. At the beginning of the period ($T_0$) assume that there are 0 IOPs. If, within 1 second, the threads have processed the allowed 100 IOPs. The thread(s) handling subsequent IOPs will see that the max threshold for that queue group has been reached for that period, and will sleep until the end of the QoS time period ($T_0+5$ seconds) before processing the new IOPs for that queue group. In this way a virtual queue is maintained where the IOPs processed by the thread(s) are "in" the queue, while those that have not been are kept "out" of the queue.

Referring to FIG. 2B, the illustrated method 210 may be executed with respect to IOPs in the queue. The method 210 is discussed with reference to the diagram shown in FIG. 3. Note that the method 310 is executed with respect to IOPs belonging to the same queue group. References to IOPs, MinIOPs, and MaxIOPs shall be understood in the discussion of FIG. 2B and FIG. 3 to refer to these entities belonging to the queue group that is the subject of the method 200. Where IOPs from multiple queue groups are stored in the same queue, the method 210 may be executed once for each queue group in the queue.

In other embodiments, each queue stores only IOPs from the same queue group and is therefore subject to the method 210 only once, but the method 210 is performed for each queue.

The method 300 includes assigning a maximum priority to IOPs to the IOPs in the queue received within the time window from a time of receipt of an oldest unexecuted IOP in the queue up to a total number of MinIOPs. Stated differently, starting at the oldest unexecuted IOP in the queue, the IOPs will be assigned the maximum priority until the number of IOPs assigned the maximum priority is equal to MinIOPs.

Those IOPs in the queue received within the time window from a time of receipt of an oldest unexecuted IOP in the queue and are in excess of MinIOPs are assigned a minimum priority that is less than the maximum priority. Stated differently, those IOPs received within the time window but later than those assigned the maximum priority because they are in excess of MinIOPs are assigned the minimum priority.

Note that the minimum priority and maximum priority may be specific to the queue group that is the subject of the method 210. For example, a queue group with higher priority hay have higher maximum and minimum priorities than a lower priority queue group. In some embodiments, the maximum and priorities function as a queue group identifier, i.e. each has a unique value that identifies the queue group to which an IOP belongs when tagged with the maximum or minimum priority. In some embodiments, the minimum priority will be a value near zero whereas the maximum priority may be a value on the order of a thousand or more. For example, for queue group 3, the maximum priority is 1003 and the minimum priority is 3. For queue group 2, the maximum priority is 1002 and the minimum priority is 2, and so on for each queue group.

Figure 3:
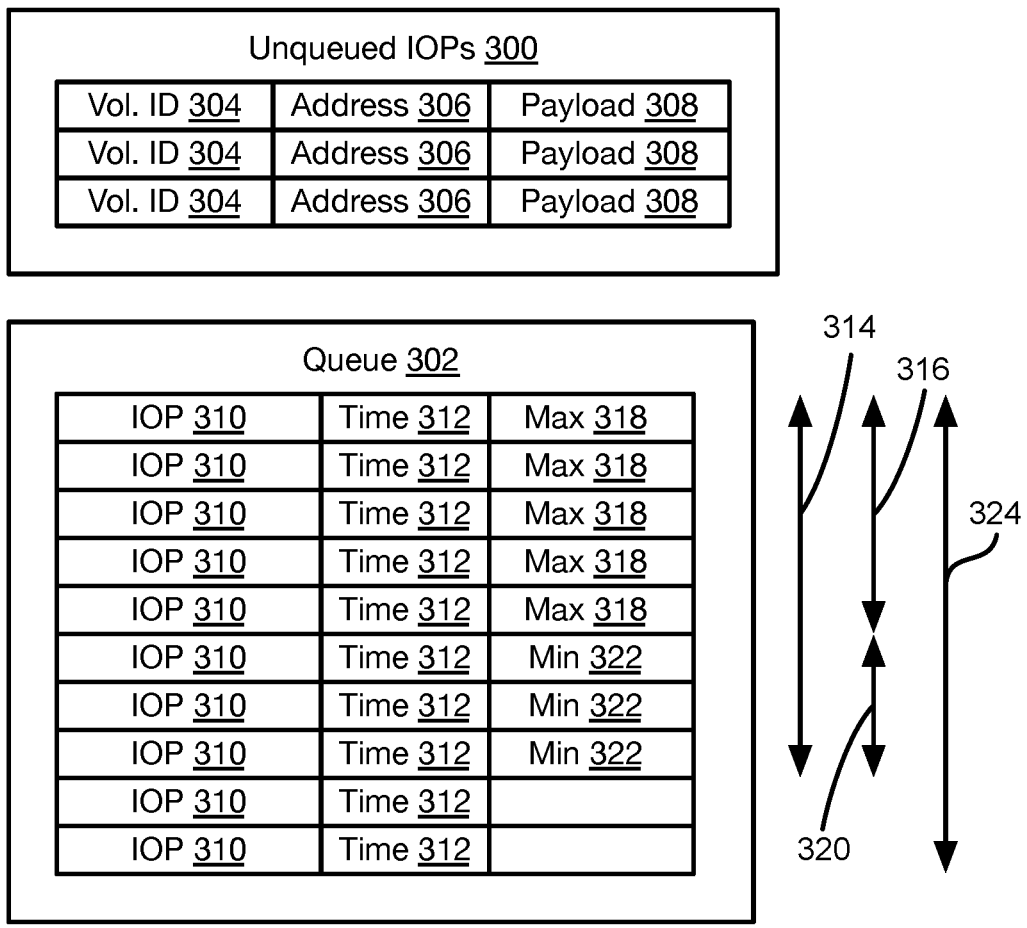
FIG. 3 is a schematic diagram illustrating processing of IOPs according to the methods of FIGS. 2A and 2B in accordance with an embodiment of the present invention.

Referring to FIG. 3, IOPs that are not queued may be stored in a separate queue 300 until they can be added to the queue referenced with respect to FIGS. 2A and 2B. Each IOP may include such information as a volume identifier 304 referring to a logical storage volume, address 306 within the logical storage volume, and payload data 308 in the case of a write command or size or range of addresses in the case of a read or delete command.

IOPs are added to the queue 302 in the order received, with the top IOPs 310 at the top of the queue being oldest in the illustrated example. A time 312 that the IOP was added to the queue 302 may be stored for each IOP 310. The time 312 may also be a time the IOP was received from an application to account for delays in adding the IOP 310 to the queue 302 according to the method 200.

Portion 314 of the queue 302 indicates the portion of the queue containing IOPs 310 received within the time window from the last unexecuted IOP 310. Portion 316 indicates the range of IOPs 310 assigned the maximum priority 318 and will be in number less than or equal to MinIOPs. Portion 320 includes the IOPs 310 that are within the time window from the last unexecuted IOP 310 but in excess of MinIOPs. These IOPs are assigned a minimum priority Those IOPs that are outside of the time window are not assigned a priority. The total number 324 of IOPs 310 in the queue 302 is constrained to be less than MaxIOPs according to the method 200.

In the diagram of FIG. 3, only IOPs for the queue group that is the subject of the method 210 are shown. However, in practice, IOPs from other queue groups may be intermingled in the queue 302. In other embodiments, each queue group may have its own queue.

Referring again to FIG. 2B, the method 210 may further include evaluating 216 whether acknowledgment of completion of an IOP from the queue 302 has been received. If so, that IOP is removed 218 from the queue 302. IOPs 310 may be transmitted from the queue 302 in the order received prior to receiving acknowledgments and may be sent in blocks or individually at a predetermined rate or based on capacity of the storage node to which the IOPs 310 are transmitted.

If an IOP 310 in the queue is found 220 to be unexecuted after a time period equal to the time window for the queue group to which it belongs, then an alert may be generated 222. In some embodiments, priority of IOPs within that queue group may be increased in order to avoid failing to meet the QoS for that queue group.

Note that steps 212 and 214 may be executed repeatedly, such as periodically according to a fixed period or for every N IOPs that is acknowledged, where N may be a value equal to one or a larger integer. Accordingly, the minimum priorities 322 may be changed to the maximum priorities 318 as IOPs are acknowledged and removed from the queue 302 and the time window moves forward in time.

Figures 4, 5A, 5B:
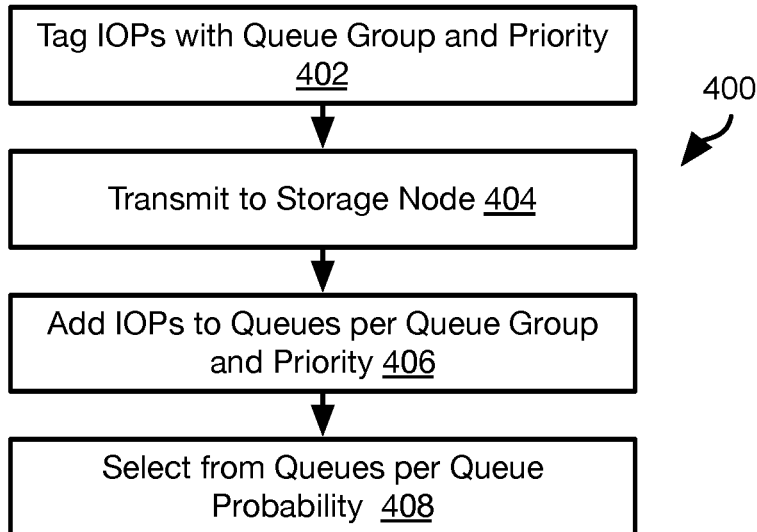
FIG. 4 is a process flow diagram of a method for transmitting IOPs to a storage node with assigned priorities in accordance with an embodiment of the present invention.
FIGS. 5A and 5B are schematic diagrams illustrating implementation of queues on a storage node in accordance with an embodiment of the present invention.

Referring to FIG. 4, IOPs 310 from the queue 302 are transmitted to one or more storage nodes 106, such as a storage node storing a logical storage volume reference by each IOP 310. As discussed above, IOPs 310 may remain in the queue 302 until acknowledgement of completion of the IOPs 310 are received.

In the illustrated example 400, IOPs 310 are selected from the queue 302 and tagged 402 with information such as an identifier of the queue group to which the IOP 310 belongs and the priority 322, 318 of the IOP 310. The tagged IOPs are then transmitted 404 to the storage node storing a logical storage volume reference by the tagged IOP.

This storage node then adds 406 the tagged IOP to one of a plurality of queues corresponding to its queue group and priority. IOPs are then selected 408 from the plurality of queues and executed according to the priorities of the plurality of queues.

Referring to FIGS. 5A and 5B, a storage node 106 may maintain three types of queues: a user queue 502, a clone queue 504, and a garbage collection queue 506. Note that although three types of queues are listed here, any number of queues, e.g. four or more, could be implemented with their own priorities. IOPs could then be addressed to these queues and processed according to their priorities in the same manner as for the three queues discussed below. The user queue stores IOPs received from user applications executing on compute nodes 110. The clone queue 504 stores IOPs received from other storage nodes that are used to update replicas of a primary copy of a logical storage volume. The garbage collection queue 506 stores IOPs generated as part of a garbage collection process, i.e. IOPs copying valid data to new areas of storage from a former area of storage having a high concentration of invalid data so that the former areas of storage may be freed for storing new data.

Each queue type has a probability 508 associated therewith indicating the probability that an IOP will be selected from a queue of a give type 502, 504, 506. In general, the user queue will have higher probability 508 then the clone queue 504 and the clone queue has higher probability than the garbage collection queue 506. In this manner, original IOPs and replication IOPs will be given higher priority than garbage collection IOPs.

Referring to FIG. 5B, the user queue 502 may be divided into a set 510 of high priority queues and a set 512 of low priority queues. Each high priority queue 514 in the set 514 corresponds to a particular queue group. Accordingly, each IOP referencing a queue group and having the maximum priority for that queue group will be added to the queue 514 for that queue group and executed in the order in which it was received (first in first out (FIFO). Each queue 514 has a probability 516 associated with it that corresponds to the priority of the queue group for the each queue. Accordingly, higher priority queues will have higher probabilities 516.

In a like manner, each low priority queue 518 in the set 512 corresponds to a particular queue group. Accordingly, each IOP referencing a queue group and having the minimum priority for that queue group will be added to the queue 518 for that queue group and executed in the order in which it was received (first in first out (FIFO).

As noted above with respect to the method 210, the priorities of IOPs may change as IOPs are executed and the time window moves forward in time. As this occurs, the compute node 110 may transmit updated priorities for IOPs that are already stored in the low priority queue 518. These IOPs may then be moved to the high priority queue 514 in response to the updated priority. It is unlikely, but in some instances an update may change the priority of an IOP from the maximum priority to the minimum priority. Accordingly, the IOP would be moved to the low priority queue 518 from the high priority queue.

In use, when the user queue 502 is selected, one of the queues 514 will be selected based on the probabilities 516. If the queue 514 is empty, then an IOP from the low priority queue 518 corresponding to the selected high priority queue 514 (belonging to the same queue group) will be executed.

In some embodiments, each of the clone queue 504 and the garbage collection queue is similarly divided into high and low priority queues 514, 518 and corresponding probabilities 516 for each queue group. The probabilities 516 may be the same or different for each type 502-506 of queue.

Figure 6:
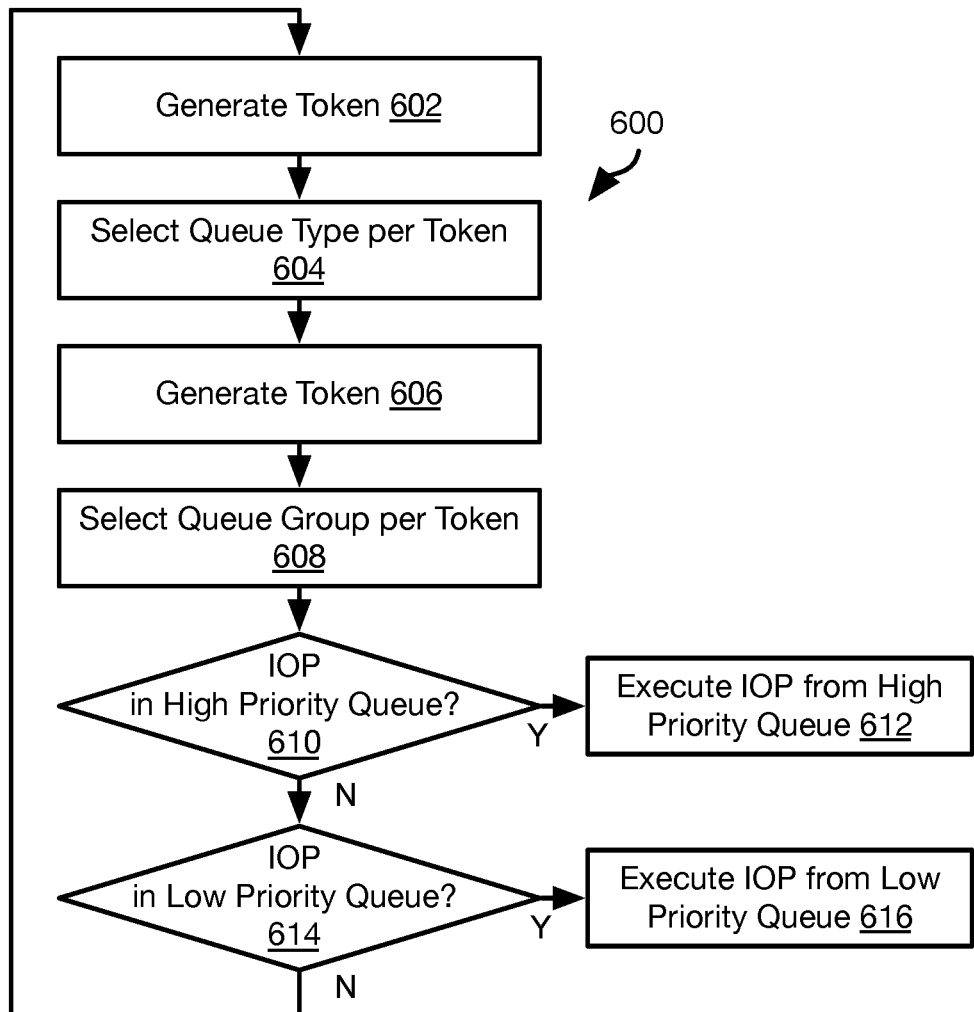
FIG. 6 is a process flow diagram illustrating the selection of IOPs from queues of a storage node in accordance with an embodiment of the present invention.

FIG. 6 illustrates one method 600 for selecting among the types of queues 502-506 and among the high priority queues 514. In the method 600, probabilities 508 and probabilities 516 are represented by a range of values such that the ranges for probabilities 508 do not overlap one another and the ranges for probabilities 516 do not overlap one another. To implement a higher probability for a given probability 508, 516, the range of possible values for it is increased.

The method 600 includes generating 602 a first token and selecting 604 a queue type (502-506) having a range of values including the first token. The first token may be generated using a random, e.g., pseudo random, number generator. The random number generate may generate numbers with a uniform probability distribution within a minimum (e.g., 0) and maximum value, the ranges of values assigned to the types of queues 502-506 may be non-overlapping and completely cover the range of values between the minimum and maximum values.

The method 600 includes generating 606 a second token and selecting 608 a queue 514 having a range of values including the second token. Stated differently, a queue group may be selected, which has a corresponding high priority queue 514 and a low priority queue 518 The first token may be generated using a random, e.g., pseudo random, number generator in the same manner as for step 602.

If the queue 514 selected at step 608 if found 610 to include at least one IOP, then the oldest IOP in the selected queue 514 is executed 612.

If not, and the low priority queue 518 corresponding to the same queue group as the queue 514 is found 614 to include at least one IOP, then the oldest IOP in the low priority queue 518 is executed 616.

The IOP executed at step 612 or 616 is removed from the corresponding queue 514, 518 in which it was stored and the method repeats at step 602.

Figure 7:
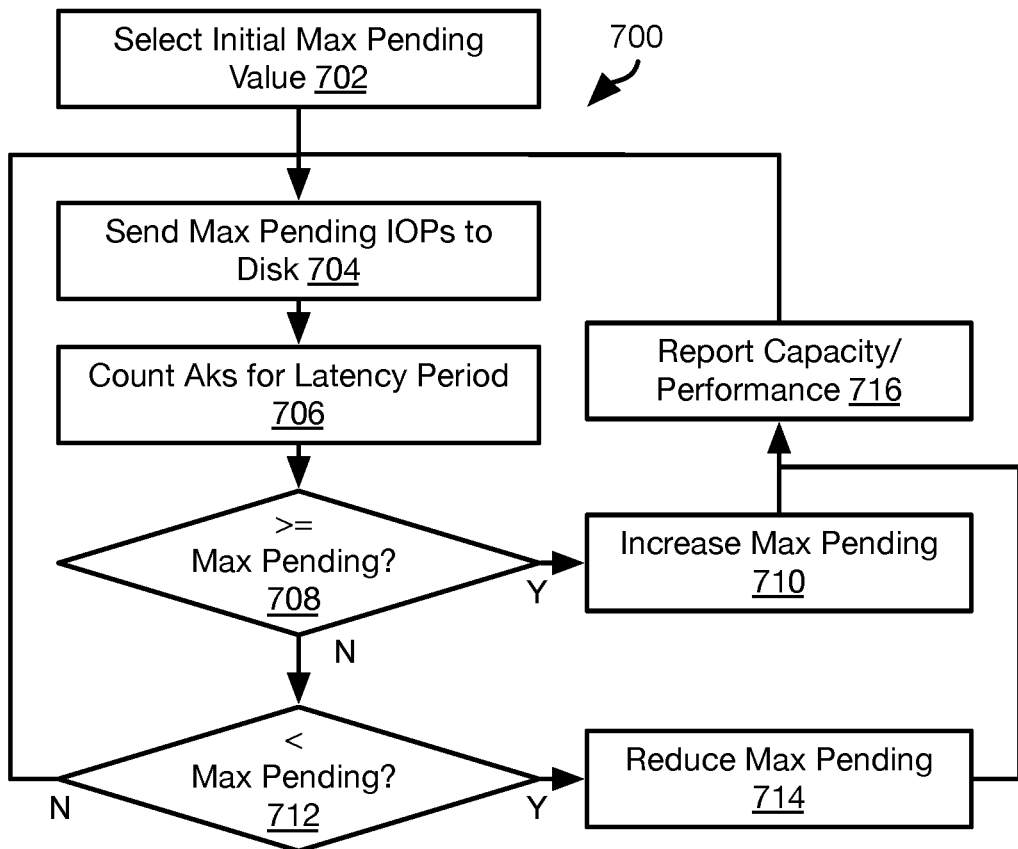
FIG. 7 is a process flow diagram of a method for determining the performance of a storage device of a storage node in accordance with an embodiment of the present invention.

Referring to FIG. 7, logical storage volumes, or parts thereof, and replicas of logical storage volumes, or parts thereof, may be assigned to storage nodes based on performance (e.g., IOPs/s) and storage capacity (gigabytes GB, terabytes (TB), etc.).

The method 700 illustrates an approach for determining the performance of a storage device 108 of a storage node 106. The method 700 may be executed for each storage device 108 ("the subject device") of the storage node 106 ("the subject node"). The combined, e.g. summed, performances of the storage devices 108 of the subject node indicate the performance of the subject node.

The method 700 includes selecting 700 an initial value for "Max Pending." This may be a manual selection or based on prior assessments of the performance of the subject device.

The method 700 then includes sending 704 a number of IOPs equal to max pending to the subject device. These IOPs may be selected from queues according to the approach of FIGS. 4 through 5A and 5B or some other approach.

The method 700 may further include counting 706 a number of acknowledgments received during a latency period, i.e. within a latency period from at time of sending of the first IOP sent at step 704. The latency period may be an operator specified value. A large latency period means adaptation to changes in the performance of the subject device will be slower. A shorter period adds more overhead processing but results in more accurate tracking of performance. In general, the latency period should be many multiples (e.g., at least four times) the latency of the subject device. A latency period of 2 ms to 500 ms has been found to be adequate for most applications.

If the count of step 706 is found 708 to be larger than or equal to max pending, then the value of max pending is increased 710 and the method repeats from step 704. In some embodiments, max pending is initially set to a small value. Accordingly, the increases of step 710 may be large, e.g. doubling of the former value of max pending. Other increments may be used and may be constant or a function of the former value of max pending, e.g. the increment amount may be a fixed value or increase or decrease with increase in the value of max pending.

If the count of step 706 is found 712 to be smaller than max pending, then the value of max pending is decreased 714 and the method repeats from step 704. In some embodiments, max pending is decreased more gradually at step 714 then it is increased at step 716. Accordingly, the decrement amount or function that computes the new value of max pending may result in a much smaller decrease than the corresponding increase for the same prior value of max pending at step 710, e.g. less than half of the value of the corresponding increase, less than 10 percent of the corresponding increase, or some other percentage.

The performance as adjusted at step 710 or 714 for each storage device 108 may be reported 716 to the storage manager 102 for purposes of assigning logical storage volumes to storage nodes and storage devices 108 of storage nodes 106. At step 716, usage of each storage device 108 of the storage node may also be reported 176, i.e. the amount of physical storage space that is currently storing data and not available to be overwritten. Step 716 may be performed for each iteration of the method 700 or less frequently. Usage and performance may be reported separately and independently from one another and at different update intervals.

Figure 8:
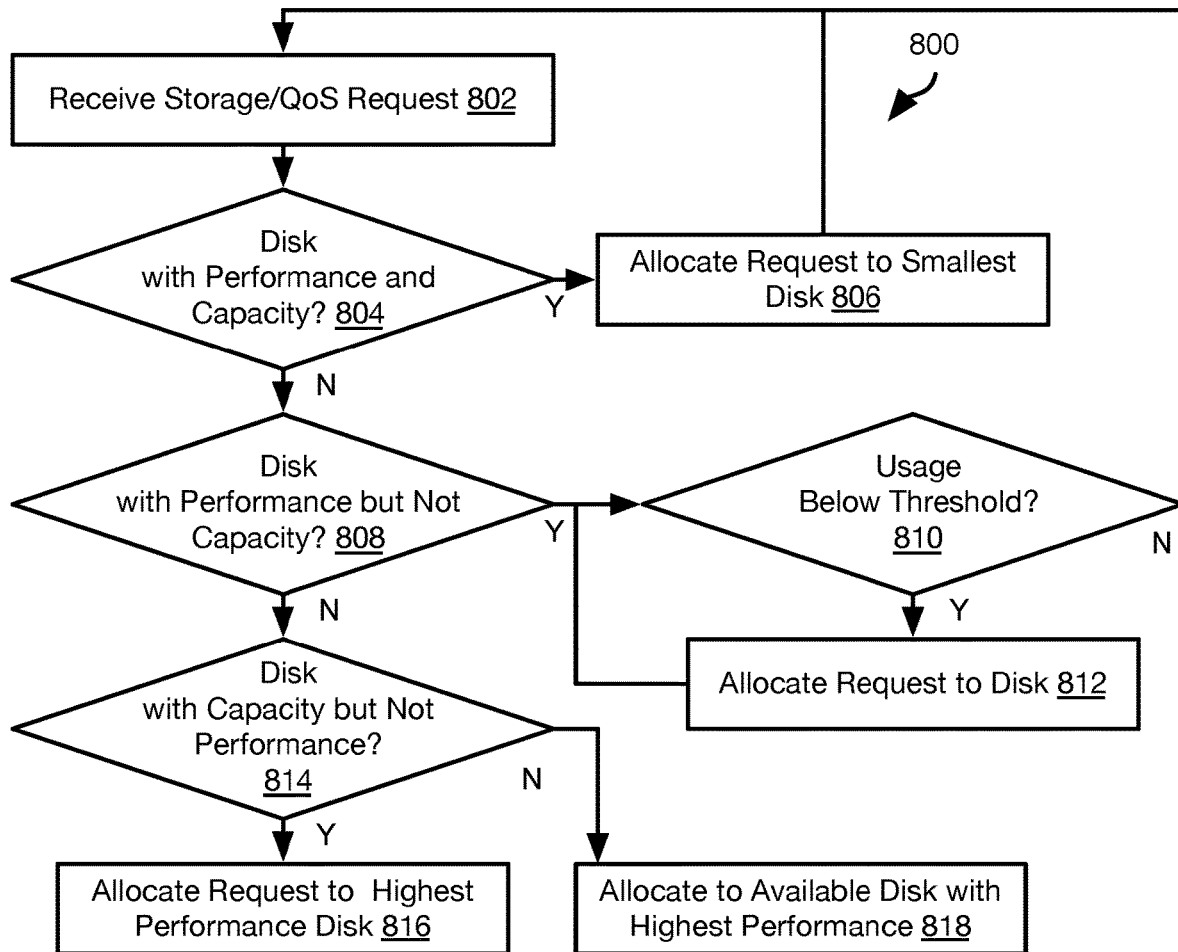
FIG. 8 is a process flow diagram of a method for assigning a logical storage volume to a storage node in accordance with an embodiment of the present invention.

FIG. 8 illustrates a method 800 that may be executed by the storage manager 102 to allocate logical storage volumes, or portions thereof, to storage nodes 106 and storage devices 108 of storage nodes 106.

The method 800 includes receiving 802 a request for storage that includes both a storage requirement ("the capacity requirement") and a quality of service (QoS) requirement ("the performance requirement").

The method 800 may include evaluating whether a storage device 108 of one of the storage nodes 106 has both performance and capacity sufficient to meet the performance requirement and the capacity requirement. The capacity and performance of the storage device may be as reported 716 according to the method 700. As used herein with respect to the method 800, "capacity" is a portion of the total storage capacity of a device 108 that is available to be written or overwritten, i.e. is not currently storing data that is not available to be overwritten. As used herein with respect to the method 800, "performance" is a portion of the total performance of a device 108 that is not currently used, i.e. based on current measurements of throughput of the device 108 within some window preceding the current time, the device 108 is available to process additional IOPs at a rate equal to the "performance" before the total performance of the device 108 is fully used. Total performance may refer to the performance reported by the device 108 at step 716 of the method 700.

If so, then the method 800 may include allocating 806 the storage request to a smallest capacity device 108 meeting the condition of step 804. Allocating a storage request to a storage device 108 may include notifying the storage node 106 hosting the storage device, generating a logical storage volume for the storage request, and executing IOPs by the hosting storage node 106 with respect to the logical storage volume using the storage device 108 to which the storage request was allocated.

If no device 108 is found 804 to have both the performance and capacity to meet the performance and capacity requirements, the method 800 may include evaluating 808 whether a device 108 meets the performance requirement but not the capacity requirement. If so, and usage of that device 108 is found 810 to be below a threshold percentage of the capacity of the device 108, then the storage request may be allocated 812 to that device 108. Where multiple devices 108 meet the condition of step 808, the device 108 selected may be the smallest capacity device 108 meeting the condition of step 808.

If multiple devices are found to match the capacity and performance requirements, then a device from among these devices that most closely matches the requirements may be selected. For example, if the requirement is for 100 GB@10000 IOPS and there are two devices—D1 with 200 GB@20000 IOPS and D2 with 150 GB@15000 IOPS we will pick D2. In some embodiments, if D1 has 200 GB@15000 IOPS and D2 has 150 GB@20000 IOPs, D2 will be selected according to a preference to select the lowest capacity device from among the multiple devices that meet the requirements. In some embodiments, the lowest performance device may be selected from among the multiple devices that meet the requirements when specified by a configuration parameter.

Where a device 108 meeting the condition of step 804 is not found and a device 108 meeting the condition of step 808 is selected, usage of the selected device 108 may be evaluated 810 periodically. In the event that the usage of the selected device 108 exceeds the threshold percentage of the total capacity of the selected device 108, one or more logical storage volumes allocated to the selected device may be reassigned, such as by executing the method 800 for the one or more logical storage volumes.

Specifically, the performance and capacity requirements of the logical storage volumes created upon allocation 812 may be used to select a different device according to the method 800 in the same manner as for an original storage request received at step 802. However, actual data written to the logical storage volume may be taken into account, i.e. allocating to a device 108 such that storing the data written to the logical volume would cause the usage of the device to exceed the threshold percentage may be avoided.

If no device 108 meets the condition of steps 804 and 808, the method 800 may include evaluating 814 whether a device 108 is available that has a capacity meeting the capacity requirement but does not have performance meeting the performance requirement, if so, the storage request may be allocated 816 to the highest performance device 108 meeting the capacity requirement.

If no device 108 meets the conditions of steps 804, 808, and 814, the storage request may be allocated 818 to a highest performance disk that may not meet the capacity requirement. In some embodiments, if no disk meets the requirements of steps 804, 808, and 814, the storage request may remain unallocated and an alert may be generated indicating that the storage request cannot be allocated unless more storage devices 108 are added to the distributed storage system.

Figure 9:
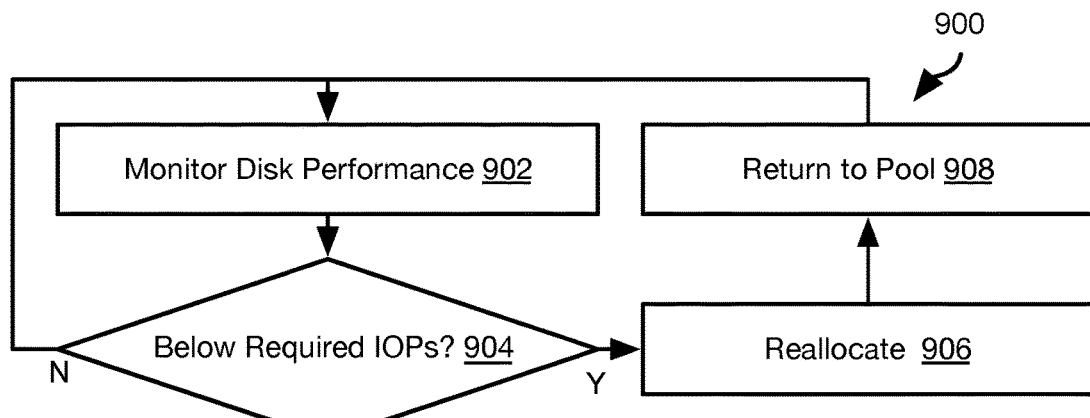
FIG. 9 is a process flow diagram of a method for reassigning a logical storage volume based on performance of a storage device in accordance with an embodiment of the present invention.

Referring to FIG. 9, after a storage request is allocated to a device 108, the method 900 may be executed by the storage node 106 hosting that device 108. The method 900 may include monitoring 902 performance of the device (see FIG. 7). If the performance of the device 108 is found 904 to fall below a required performance, e.g. a sum of the performance requirements of storage requests allocated to the device, then one or more storage requests previously allocated to the storage device may be reallocated 906, such as according to the method 800, to one or more different devices 108. The remaining performance and capacity of the storage device, as increased due to reallocation of one or more storage requests, may then be returned 908 to a pool of available devices 108 for processing according to the method 800.

In some embodiments, steps 810, 812 of the method 800 may be periodically executed by the storage node 106 for each device 108 in order to ensure that the usage of the device 108 remains below its total capacity. If not, one or more storage requests allocated to the device may be reallocated and the performance and capacity of the device that is thereby freed up may be returned to a pool of available devices 108 for allocation according to the method 800.

Figure 10:
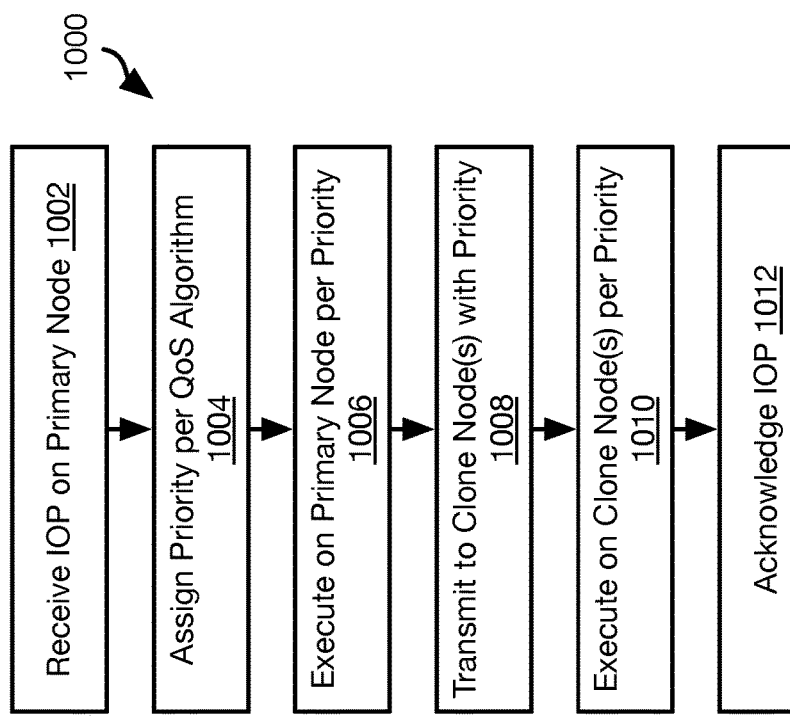
FIG. 10 is a process flow diagram of a method for coordinating QoS implementation between primary and clone nodes in accordance with an embodiment of the present invention.

Referring to FIG. 10, data written to a primary copy of each logical storage volume may also be written to one or more clone storage volumes. In some embodiments, QoS limits may also be enforced with respect to IOPs performed on the clone storage volumes. For purposes of the method 1000 of FIG. 10 a primary node is a node that stores all or part of a primary copy of a logical storage volume and a clone node is a node that stores all or part of a clone of the logical storage volume. A storage node 106 may function as a primary node for one or more logical storage volume and as a clone node for one or more other logical storage volumes.

The method 1000 may include receiving 1002 an original IOP on the primary node, such as from an application executing on a compute node 110. A priority may be assigned 1004 to the original IOP on the primary node, such as according to the approach describe above with respect to FIGS. 4 through 6. Alternatively, any other approach known in the art for implementing a QoS guarantee may be used.

The method 1000 may further include executing 1006 the original IOP on the primary node according to the priority. For example, the original IOP, along with other IOPs, may be added to one or more queues according to priority and executed with respect to one or more storage devices 108 of the primary node. In particular, the original IOPs may be executed in an order that indicates their priority, with higher priority IOPs being more likely to be executed than lower priority IOPs. An example approach for implementing this is described above with respect to FIGS. 4 through 6.

The method 1000 may further include transmitting 1008 a clone of the original IOP to one or more clone node along with the priority determined at step 104. Each clone node will then execute 1010 the clone IOP along with other IOPs received by the clone node according to the priority and the priorities of the other IOPs. In particular, the IOPs may be executed by the clone node in an order that indicates their priority, with higher priority IOPs being more likely to be executed than lower priority IOPs (e.g., according to the approach of FIGS. 4 through 6). The clone IOP is executed on the clone node with respect to the clone of the logical storage volume referenced by the original IOP of step 1002. For example, the clone IOP may include a reference to the clone storage volume or may be inferred to refer to the clone storage volume from a reference to the logical storage volume.

The clone node may transmit acknowledgment of execution of the clone IOP to the primary node. Once the original IOP is executed 1006 on the primary node and acknowledgment is received from all clone nodes, the primary node may acknowledge 1012 execution of the IOP to a source of the IOP received at step 1002, e.g., the compute node 110 that generated the IOP of step 1002.

Note that each node may operate as both a primary node and a secondary node. Accordingly, the primary node may perform the functions of the method 1000 of the primary node with respect to one or more IOPs while also performing the functions of the clone node with respect to one or more IOPs. Accordingly, both original IOPs and clone IOPs may be executed in an order according to the priorities assigned to them at step 104 according to the method 1000.

Figure 11:
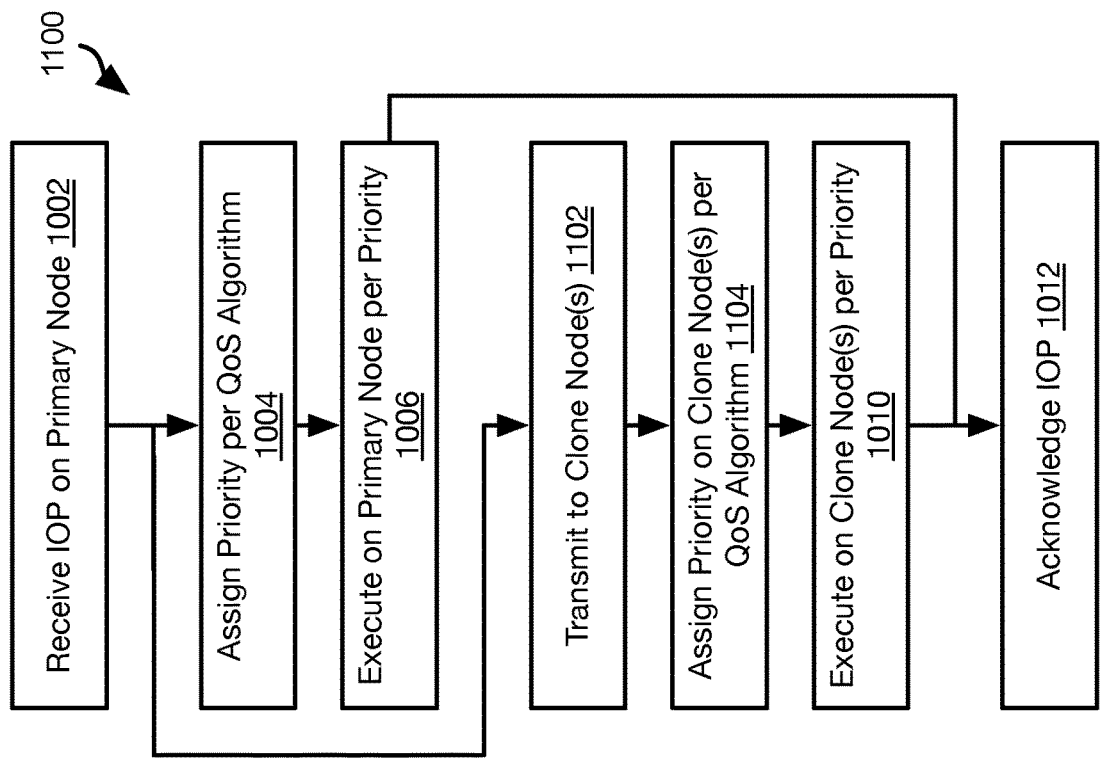
FIG. 11 is a process flow diagram of an alternative method for coordinating QoS implementation between primary and clone nodes in accordance with an embodiment of the present invention.

FIG. 11 illustrates an alternative approach for implementing QoS constraints across a primary node and one or more clone nodes. The method 1100 may include receiving 1002 an original IOP, assigning 1004 a priority to it, and executing 1006 the original IOP according to the priority in the same manner as for the method 1000.

However, in the method 1100, a clone IOP corresponding to the original IOP is transmitted 1102 to the clone node prior to assigning 1004 a priority to it. In this manner, latency is reduced since the QoS algorithm does not need to complete before the clone node receives the clone IOP. The clone node then assigns 1104 a priority to the clone IOP. Assigning a priority may take into account loading of the clone node, i.e. other IOPs that remain to be executed. In particular, where the approach of FIGS. 4 through 6 is implemented, IOPs will be selected according to a locally executed QoS approach that balances execution among multiple queues and takes into account actual throughput and loading of the clone node.

The clone node executes 1010 the clone IOP according to the priority of step 1104, which may be in the same manner as described above with respect to 1010 of the method 1000. In particular, the order in which IOPs are selected for execution may be performed according to their priority, with higher priority IOPs being more likely to be executed than low priority IOPs.

As for the method 1000, clone nodes acknowledge completion of the clone IOPs to the primary node. Once the original IOP completes on the primary node and acknowledgments are received for all of the clone IOPs, the primary node acknowledges 1012 completion of the IOP received at step 1002.

Figure 12:
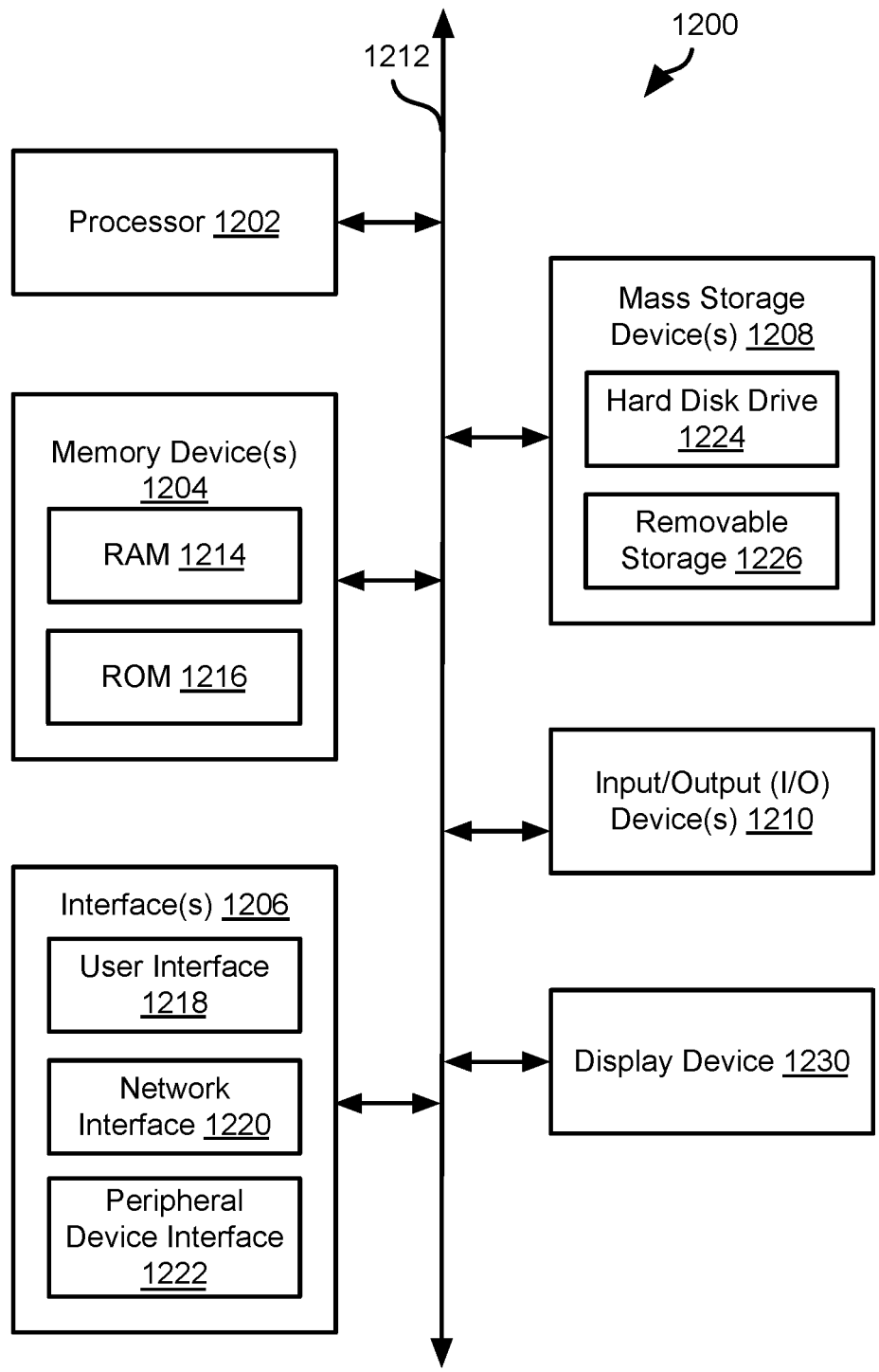
FIG. 12 is a schematic block diagram of an example computing device suitable for implementing methods in accordance with embodiments of the invention.

FIG. 12 is a block diagram illustrating an example computing device 1200. Computing device 1200 may be used to perform various procedures, such as those discussed herein. The storage manager 102, storage nodes 106, and compute nodes 110 may have some or all of the attributes of the computing device 1200.

Computing device 1200 includes one or more processor(s) 1202, one or more memory device(s) 1204, one or more interface(s) 1206, one or more mass storage device(s) 1208, one or more Input/output (I/O) device(s) 1210, and a display device 1230 all of which are coupled to a bus 1212. Processor(s) 1202 include one or more processors or controllers that execute instructions stored in memory device(s) 1204 and/or mass storage device(s) 1208. Processor(s) 1202 may also include various types of computer-readable media, such as cache memory.

Memory device(s) 1204 include various computer-readable media, such as volatile memory (e.g., random access memory (RAM) 1214) and/or nonvolatile memory (e.g., read-only memory (ROM) 1216). Memory device(s) 1204 may also include rewritable ROM, such as Flash memory.

Mass storage device(s) 1208 include various computer readable media, such as magnetic tapes, magnetic disks, optical disks, solid-state memory (e.g., Flash memory), and so forth. As shown in FIG. 12, a particular mass storage device is a hard disk drive 1224. Various drives may also be included in mass storage device(s) 1208 to enable reading from and/or writing to the various computer readable media. Mass storage device(s) 1208 include removable media 1226 and/or non-removable media.

I/O device(s) 1210 include various devices that allow data and/or other information to be input to or retrieved from computing device 1200. Example I/O device(s) 1210 include cursor control devices, keyboards, keypads, microphones, monitors or other display devices, speakers, printers, network interface cards, modems, lenses, CCDs or other image capture devices, and the like.

Display device 1230 includes any type of device capable of displaying information to one or more users of computing device 1200. Examples of display device 1230 include a monitor, display terminal, video projection device, and the like.

Interface(s) 1206 include various interfaces that allow computing device 1200 to interact with other systems, devices, or computing environments. Example interface(s) 1206 include any number of different network interfaces 1220, such as interfaces to local area networks (LANs), wide area networks (WANs), wireless networks, and the Internet. Other interface(s) include user interface 1218 and peripheral device interface 1222. The interface(s) 1206 may also include one or more peripheral interfaces such as interfaces for printers, pointing devices (mice, track pad, etc.), keyboards, and the like.

Bus 1212 allows processor(s) 1202, memory device(s) 1204, interface(s) 1206, mass storage device(s) 1208, I/O device(s) 1210, and display device 1230 to communicate with one another, as well as other devices or components coupled to bus 1212. Bus 1212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1200, and are executed by processor(s) 1202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system comprising one or more processing devices and one or more memory devices operably coupled to the one or more memory devices, the one or more memory devices storing executable code effective to cause the one or more processing devices to:
   receive a plurality of input/output operations (IOPs); and
   for each IOP
      assign a priority to the each IOP according to a priority associated with a storage volume referenced in the each IOP; and
      transmit the each IOP tagged with the priority over a network for execution,
   wherein the storage volume of the each IOP belongs to a queue group of a plurality of queue groups, each queue group of the plurality of queue groups having a queue belonging thereto, wherein the executable code is further effective to cause the one or more processing devices to:
      for each IOP, add the each IOP to a corresponding queue belonging to the queue group to which the storage volume referenced by the each IOP belongs;
      transmit the each IOP and the priority from the queue for execution according to a first-in-first-out approach; and
      for each IOP, after execution of the each IOP, remove the each IOP from the corresponding queue
   wherein the executable code is further effective to cause the one or more processing devices to, for each queue belonging to one of the queue groups of the plurality of queue groups;
      assign a first priority to a first portion of the IOPs in the each queue that were received within a time threshold from receipt of an oldest unexecuted IOP in the each queue; and
      assign a second priority to any other IOPs in the each queue that were received after the time threshold from receipt of the oldest unexecuted IOP in the each queue, the second priority being lower than the first priority.

2. The system of claim 1, wherein the executable code is further effective to cause the one or more processing devices to, for each queue belonging to one of the queue groups of the plurality of queue groups:
for each IOP, add the each IOP to the corresponding queue only when a number of IOPs in the corresponding queue is less than a maximum IOP value.

3. The system of claim 1, wherein the executable code is further effective to cause the one or more processing devices to, for each queue belonging to one of the queue groups of the plurality of queue groups:
(a) beginning at the oldest unexecuted IOP in the each queue, assign the first priority to IOPs in the queue received within the time threshold from receipt of the oldest unexecuted IOP until a number of IOPs assigned the first priority is equal to a minimum IOP value; and
(b) assign the second priority to any remaining IOPs in the each queue not assigned the first priority.

4. The system of claim 3, wherein the executable code is further effective to cause the one or more processing devices to repeat (a) and (b) periodically for each queue belonging to one of the queue groups of the plurality of queue groups.

5. The system of claim 4, wherein the executable code is further effective to cause the one or more processing devices to, transmit an updated priority for each unexecuted IOP in the each queue that is changed according to repetition of (a) and (b).

6. The system of claim 1, further comprising one or more storage nodes, each storage node of the one or more storage nodes further programmed to, for each queue group of at least a portion of the plurality of queue groups:
for each IOP received by the each storage node that corresponds to the each queue group, add the each IOP to a first queue if the each IOP is assigned the first priority and adding the each IOP to a second queue if the each IOP is assigned the second priority; and
execute IOPs within the second queue only when the first queue is empty.

7. The system of claim 6, wherein each storage node is further programmed to:
select a selected queue group from the at least the portion of the plurality of queue groups according to queue priorities associated with the at least the portion of the plurality of queue groups; and
execute an IOP from one of the first and second queues of the selected queue group.

8. The system of claim 7, wherein each storage node is further programmed to, for each queue group of the at least the portion of the plurality of queue groups:
assign a unique range of token values to the each queue group, a number of values in the unique range of token values corresponding to the queue priority of the each queue group;
execute an IOP from one of the first and second queues of the each queue group when a token generator outputs a value within the unique range of token values.

9. A method comprising:
receiving, by a computing device comprising one or more processing devices, a plurality of input/output operations (IOPs);
for each IOP
assigning, by the computing device, a priority to the each IOP according to a priority associated with a storage volume referenced in the each IOP; and
transmitting, by the computing device, the each IOP tagged with the priority for execution,
wherein the storage volume of the each IOP belongs to a queue group of a plurality of queue groups, each queue group of the plurality of queue groups having a queue belonging thereto, wherein the method further comprises:
for each IOP, adding, by the computing device, the each IOP to a corresponding queue belonging to the queue group to which the storage volume referenced by the each IOP belongs;
transmitting, by the computing device, the each IOP and the priority from the queue for execution according to a first-in-first-out approach; and
for each IOP, after execution of the each IOP, removing, by the computing device, the each IOP from the corresponding queue; and
wherein the method further comprises, for each queue belonging to one of the queue groups of the plurality of queue groups:
assigning, by the computing device, a first priority to a first portion of the IOPs in the each queue that were received within a time threshold from receipt of an oldest unexecuted IOP in the each queue; and
assigning, by the computing device, a second priority to any other IOPs in the each queue that were received after the time threshold from receipt of the oldest unexecuted IOP in the each queue, the second priority being lower than the first priority.

10. The method of claim 9, further comprising, for each queue belonging to one of the queue groups of the plurality of queue groups:
for each IOP, adding, by the computing device, the each IOP to the corresponding queue only when a number of IOPs in the corresponding queue is less than a maximum IOP value.

11. The method of claim 9, further comprising, for each queue belonging to one of the queue groups of the plurality of queue groups:
(a) beginning at the oldest unexecuted IOP in the each queue, assigning, by the computing device, the first priority to IOPs in the queue received within the time threshold from receipt of the oldest unexecuted IOP until a number of IOPs assigned the first priority is equal to a minimum IOP value; and
(b) assigning, by the computing device, the second priority to any remaining IOPs in the each queue not assigned the first priority.

12. The method of claim 11, further comprising repeating, by the computing device, (a) and (b) periodically for each queue belonging to one of the queue groups of the plurality of queue groups.

13. The method of claim 12, further comprising transmitting, by the computing device, an updated priority for each unexecuted IOP in the each queue that is changed according to repetition of (a) and (b).

14. The method of claim 9, further comprising:
providing one or more storage nodes;
by each storage node of the one or more storage nodes, for each queue group of at least a portion of the plurality of queue groups
for each IOP received by the storage node that corresponds to the each queue group, adding the each IOP to a first queue if the each IOP is assigned the first priority and adding the each IOP to a second queue if the each IOP is assigned the second priority; and
executing IOPs within the second queue only when the first queue is empty.

15. The method of claim 14, further comprising, by each storage node of the one or more storage nodes:

selecting a selected queue group from the at least the portion of the plurality of queue groups according to queue priorities associated with the at least the portion of the plurality of queue groups; and executing an IOP from one of the first and second queues of the selected queue group.

16. The method of claim 15, further comprising, by each storage node of the one or more storage nodes, for each queue group of the at least the portion of the plurality of queue groups:

assigning a unique range of token values to the each queue group, a number of values in the unique range of token values corresponding to the queue priority of the each queue group;

executing an IOP from one of the first and second queues of the each queue group when a token generator outputs a value within the unique range of token values.

* * * * *